United States Patent [19]
Kashiwagi

[11] Patent Number: 6,033,201
[45] Date of Patent: Mar. 7, 2000

[54] METHOD FOR PRODUCING COMPOSITE INSULATOR

[75] Inventor: Hiroshi Kashiwagi, Nagoya, Japan

[73] Assignee: NGK Insulators, Ltd., Japan

[21] Appl. No.: 09/083,433

[22] Filed: May 21, 1998

Related U.S. Application Data

[62] Division of application No. 08/813,908, Mar. 7, 1997, Pat. No. 5,811,049.

[30] Foreign Application Priority Data

Mar. 18, 1996 [JP] Japan .................................. 8-061031

[51] Int. Cl.⁷ .............................. B29C 33/12; B29C 45/36
[52] U.S. Cl. .......................... 425/116; 425/125; 425/127; 425/215
[58] Field of Search .................................... 425/116, 117, 425/125, 127, 129.1, 215, DIG. 47

[56] References Cited

U.S. PATENT DOCUMENTS

| | | | |
|---|---|---|---|
| 4,405,083 | 9/1983 | Charlebois et al. | 425/116 |
| 4,702,873 | 10/1987 | Kaczerginski | 264/135 |
| 4,856,753 | 8/1989 | Schwaiger et al. | 425/121 |
| 5,356,587 | 10/1994 | Mitsui et al. | 425/116 |
| 5,523,038 | 6/1996 | Kunieda et al. | 264/135 |
| 5,540,991 | 7/1996 | Hayakawa et al. | 425/116 |
| 5,723,155 | 3/1998 | Hayakawa et al. | 425/116 |
| 5,753,272 | 5/1998 | Kashiwagi | 425/116 |
| 5,882,568 | 3/1999 | Kashiwagi | 425/116 |

*Primary Examiner*—Robert Davis
*Attorney, Agent, or Firm*—Parkhurst & Wendel, L.L.P.

[57] ABSTRACT

A method of producing a composite insulator having a sheath and shed portions molded around a core rod, grasping metal fittings engagingly fitted and fixed at both end portions of the core rod, the sheath covering the core rod between the grasping metal fittings on the whole circumference of the core rod, and a plurality of shed portions extruding radially outwardly from the sheath at plural positions spaced from each other in the longitudinal direction of the core rod, by filling an insulative high molecular material and subsequent vulcanization thereof in the cavity of molding die portions. The methods includes positioning and retaining the core rod at a desired position in the cavity of the molding die portions by means of retaining rings engagingly fitted on the grasping metal fittings and allowing an excess portion of the insulative high molecular material filled in the cavity to flow out to the exterior of the cavity between the grasping metal fittings and the retaining rings.

3 Claims, 3 Drawing Sheets

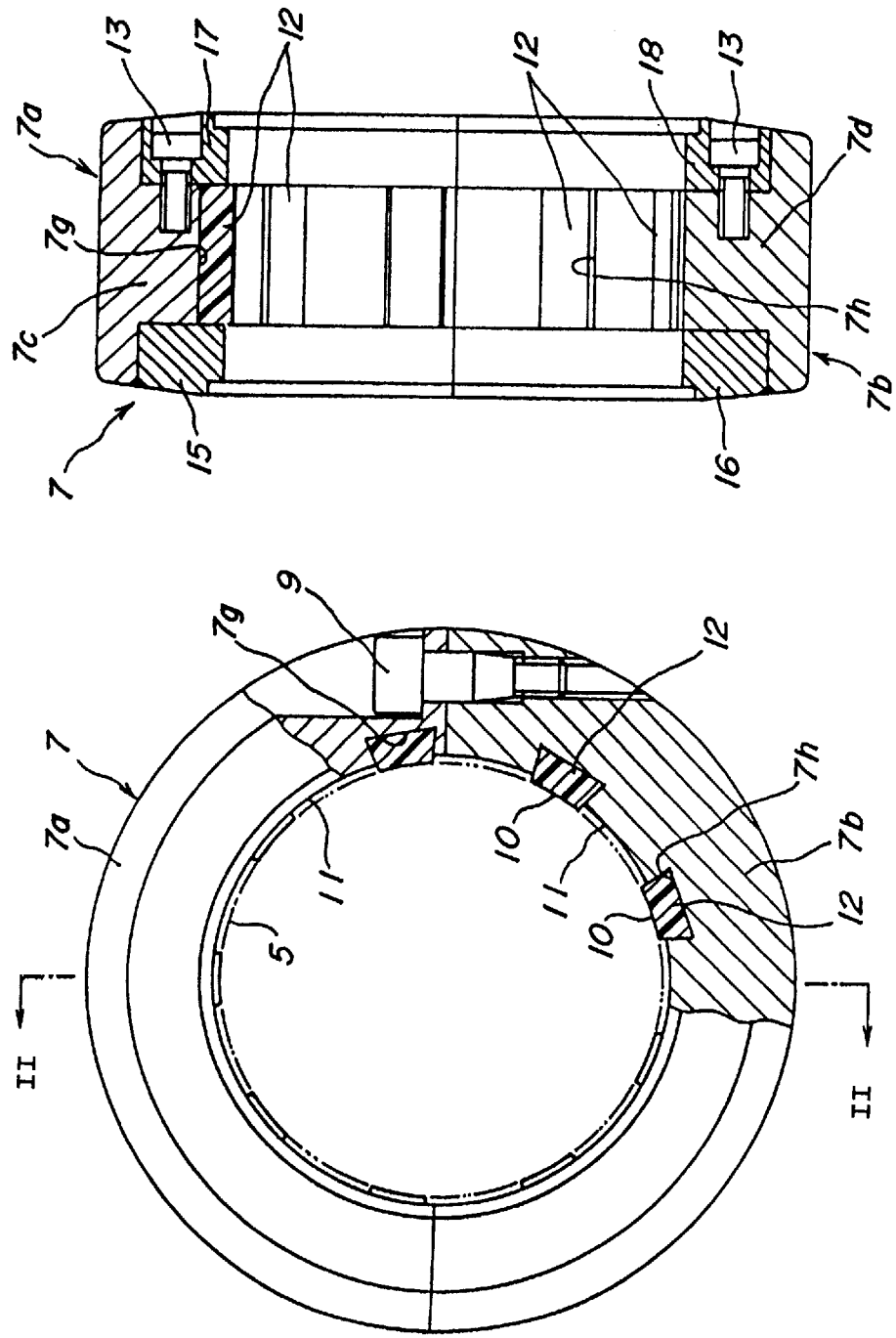
FIG_2a
FIG_2b

FIG_3
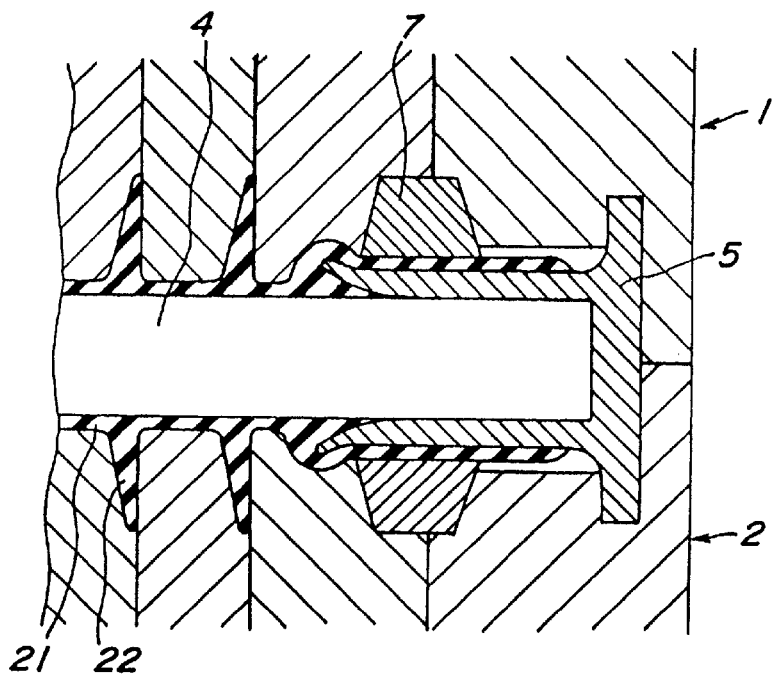
FIG_4
PRIOR ART
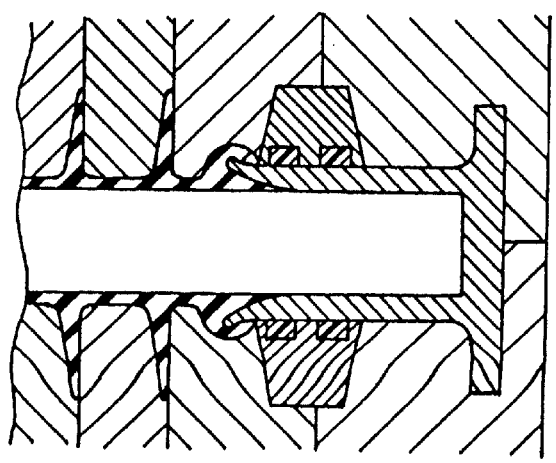

METHOD FOR PRODUCING COMPOSITE INSULATOR

This is a Division of application Ser. No. 08/813,908 filed Mar. 7, 1997 and now U.S. Pat. No. 5,811,049.

BACKGROUND OF THE INVENTION

1. Field of the Invention

The present invention relates to a method for producing a composite insulator and a retaining ring for retaining a core rod on a molding die. Particularly, the present invention effectively prevents generation of cracks on a parting line portion formed at a molding die corresponding to a dividing position of the molding die at the time of molding a sheath and a shed portion using a pair of divided molding die portions. The term "insulator" used herein means also a so-called "hollow insulator".

2. Related Art Statement

Heretofore, a composite insulator having a solid or hollow core rod made of a fiber-reinforced resin or the like and an insulative high molecular material applied on the outer cicumferential surface of the core rod to integrally form a sheath and a plurality of shed portions separately disposed in the axial direction of the core rod is known. Such a composite insulator is produced mostly by compression molding, injection molding, transfer molding or the like of an insulative high molecular material using a pair of molding die portions defining a cavity therein.

When producing such a composite insulator by vulcanization molding of an insulative material under heating and pressure filled in the cavity of the divided molding die portions, there arises a high concern that cracks are generated along a parting line on the sheath and shed portions of the composite insulator at a portion corresponding to a dividing position of the molding die portions due to thermal expansion of the core rod positioned at a determined position in the cavity of the molding die portions, particularly if the core rod has a large diameter of at least about 40 mm.

Such a phenomenon is considered to occur due to concentration of stress at the parting line portion positioned corresponding to the dividing position of the molding die portions at an instance of releasing the molding die portions for releasing the molded article from the molding die portions, when an inner pressure in an insulative high molecular material is increased to a certain level or more due to proceeding of thermal expansion of the insulative high molecular material heated in the cavity of the divided molding die portions.

Thus, the cracks on the parting line portion can effectively be prevented from occurring by restricting the increase of inner pressure in the insulative high molecular material caused by thermal expansion of the core rod, even though the thermal expansion of the core rod per se is unavoidable.

Then, in order to prevent the occurrence of the afore-described cracks, there are proposed a way of providing on the molding die portions a number of outlet grooves for allowing the high molecular material to escape in the grooves even when the core rod is thermally expanded so as to restrict the increase of the inner pressure in the insulative high molecular material in the cavity, a way of reducing a tightening force for combining the pair of the molding die portions together to allow a relatively large amount of the high molecular material flow in the cavity defined by the combined molding die portions at the time of vulcanization forming of the molecular material to restrict the increase of the inner pressure in the high molecular material, and a way of reducing the extent of the thermal expansion of the core rod by setting a temperature for heating the molding die portions at low levels to decrease the inner pressure in the high molecular material, and the like.

However, in the conventional way of providing a number of escaping grooves on the molding die portions, many processing treatments on the opposing surfaces of the pair of the molding die portions are required which result in a disadvantage of necessitating a large number of processing processes for the molding die portions and a disadvantage of necessitating a large number of working processes, such as cleaning of the molding die portions and the like, at each time of completing the molding operation. Also, in the conventional way of reducing a tightening force for combining the pair the molding die portions together, particularly in the case of pressing molding, a disadvantage occurs sometimes in that the products of desired shape cannot be obtained. And, in the conventional way of setting a heating temperature for the molding die portions at low levels, there is a disadvantage in that the time for the vulcanization heating treatment is unavoidably prolonged to increase the cycle time to decrease the production efficiency.

SUMMARY OF THE INVENTION

The present invention is accomplished in an effort of obviating all the aforementioned problems of the conventional techniques.

An object of the present invention is to provide a method for producing a composite insulator with a sufficiently high production efficiency and a high utilizing percentage of raw material without increasing the working processes and the cleaning processes for the molding die portions for each molding operation.

Another object of the present invention is to provide a retaining ring for retaining the core rod on the molding die.

The present invention is a method for producing a composite insulator having a core rod, grasping metal fittings engagingly fitted and fixed at both end portions of the core rod, a sheath covering the core rod between the grasping metal fittings on the whole circumference of the core rod, and a plurality of shed portions extruding radially outwardly from the sheath at plural positions spaced from each other in the longitudinal direction of the core rod, including the steps of forming the sheath and the shed portions by filling an insulative high molecular material and subsequent vulcanization thereof in the cavity of the molding die portions by means of either one of the aforementioned conventional methods, comprising a step of positioning and retaining the core rod at a desired position in the cavity of the molding die portions by means of the retaining rings engagingly fitted on the grasping metal fittings, and allowing an excess portion of the insulative high molecular material filled in the cavity to flow out to the exterior of the cavity between the grasping metal fittings and the retaining rings.

According to the method of the present invention, in case of forming an insulative high molecular material by vulcanization, the excess of the high molecular material obtained by thermal expansion of the core rod is pushed out to the exterior of the cavity through gaps defined between the grasping metal fittings and the retaining rings thereby to effectively prevent the increase of the inner pressure in the high molecular material. Therefore, the cracks on the parting line portion of the molding die portions of the composite insulator resulting from the thermal expansion of the core rod can completely be prevented from occurring.

The retaining rings for retaining the core rod in the molding die according to the present invention serve to position and retain the core rod at a desired position in the cavity of the molding die portions, while circumscribing the grasping metal fittings fitted and fixed on the both end portions of the core rod. The retaining rings have respectively supporting portions on the inner circumferential surface, which contact with the outer circumferential surfaces of the grasping metal fittings. The retaining rings also have gaps defined along the length of the axial direction of the retaining rings between the inner circumferential surface and the outer circumferential surface of the grasping metal fittings for providing an outlet portion for flowing out the excess of the high molecular material.

By engaging fitting the outer circumferential portion of the retaining rings respectively with the inner circumference portion of the opposing molding die portion, the retaining rings can position and retain the grasping metal fittings and hence the core rod exactly at a desired radial position and axial direction in the cavity of the molding die portions by a function of the supporting portions which contact with the grasping metal fittings. In addition, the inner pressure in the insulative high molecular material in the cavity can effectively be reduced by allowing the excess of the high molecular material formed at the time of vulcanization of the high molecular material to flow out through the gaps between the outer circumferential portion of the retaining rings and the outlet portion of the retaining ring to the exterior of the cavity in the axial direction of the core rod.

The retaining rings are preferably provided with a plurality of supporting portions and outlet portions respectively at a spaced distance in the circumferential direction, with the supporting portions being preferably made of a fluorine series resin.

BRIEF DESCRIPTION OF THE DRAWING

For a better understanding of the present invention, reference is made to the accompanying drawings, in which:

FIG. 2(a) is an enlarged schematic partial cross-sectional plan view of the retaining ring;

FIG. 2(b) is an enlarged schematic cross-sectional longitudinal side view of the retaining ring;

FIG. 3 is a schematic cross-sectional view of a portion of a molding die illustrating the state of the insulative high molecular material flowing out from the molding die; and FIG. 4 is a schematic cross-sectional view of a portion of a molding die illustrating a function of a conventional retaining ring.

DESCRIPTION OF THE PREFERRED EMBODIMENTS

Figure 1:
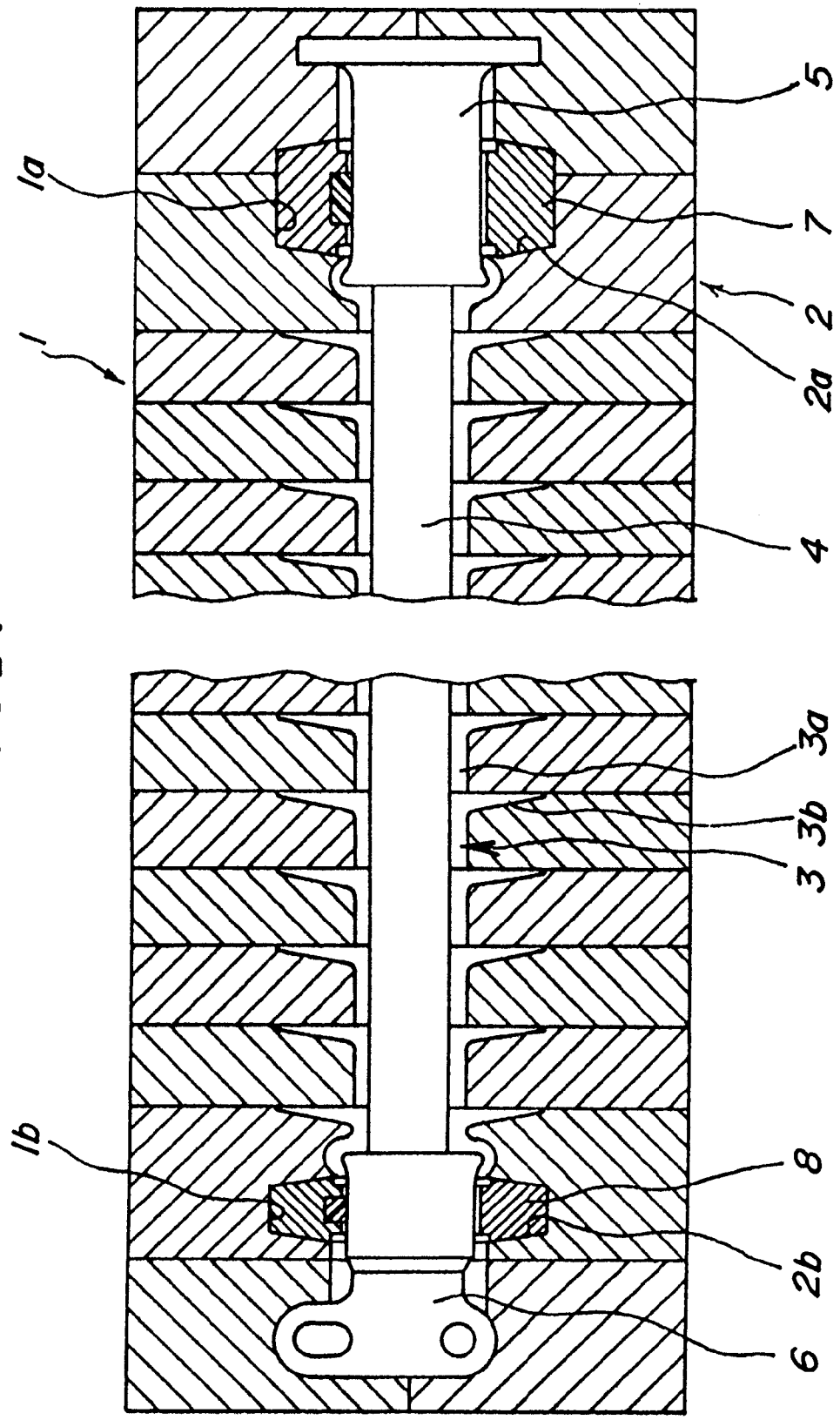
FIG. 1 is a schematic cross-sectional longitudinal view of the molding die for vulcanization with the retaining ring according to the present invention.

Hereinafter, the present invention will be explained in more detail with reference to examples shown in the drawings.

Referring to FIG. 1 showing a schematic cross-sectional longitudinal view of the present molding die illustrating the state of positioning and disposing the core rod in the cavity of the molding die, molding die portions 1, 2 are opposingly disposed in vertical direction, and the molding die portions 1, 2 define a cavity 3 therebetween when they are combined together by a fastening force.

The cavity 3 has a uniform diameter portion 3a around a later-explained core rod 4 disposed therein which forms a sheath over the whole circumference of the core rod 4, and expanded diameter portions 3b which form shed portions radially outwardly protruding at plural positions spaced from each other in the longitudinal direction of the core rod 4.

The core rod 4 is solid or hollow and positioned and disposed at a desired position in the cavity 3. Such an arrangement of the core rod 4 can be attained by attaching retaining rings 7, 8 in a circumscribing fashion on a respective grasping metal fitting 5, 6 engagingly fitted and fixed on the outer circumference of the core rod 4 at the both end portions of the core rod 4, while engagingly fitting each retaining ring 7, 8 with a respective recess 1a, 2a, 1b and 2b of the molding die portion 1, 2 without leaving a gap therebetween.

As can be clearly seen from the enlarged view of one of the retaining rings 7, 8 shown in FIG. 2, two semi-circular members 7a, 7b of the retaining ring 7 are joined together circularly around the outer circumference of the grasping metal fitting 5 by a joining bolt 9 to exhibit the function of the retaining ring 7, and contact with the outer circumferential surface of the grasping metal fitting 5 at supporting portions 10 arranged at the inner circumferential surface of the retaining ring members 7a, 7b. Meanwhile, between the supporting portions arranged at a desired spacing therebetween in the circumferential direction outlet portions 11 are provided over the whole length in the axial direction, which define desired gaps between the outer circumferential surface of the grasping metal fitting 5. In order to achieve a substantially uniform flow of the high molecular material around the core rod 4 in the cavity 3, the outlet portions 11 are preferably formed in plural numbers with a substantially equal spacing in the circumferential direction. By this arrangement, a sufficiently uniform inner pressure can be attained in the high molecular material around the whole circumference of the core rod 4. Respective size of the above-mentioned gaps defined by the outlet portion 11, a total cross-sectional area of the respective gap and a volume thereof are determined so as to restrict the increase of the inner pressure in the insulative high molecular material to a desired extent in relation to the viscosity of the high molecular material, a fluidity resistance against the respective gap and the like.

In the arrangement shown in FIG. 2, most of the supporting portions 10 are respectively made of polytetrafluoroethylene or the like fluorine series resin are embedded and fixed in the main body portion of the retaining ring 7 made of a metallic material or the like rigid material. According to this arrangement, the positioning and retaining of the grasping metal fittings 5, 6 having fluctuated outer diameter size can extremely satisfactorily be performed in the molding die even at a high temperature by means of the retaining ring 7, and as a result the precision of the positioning of the core rod 4 in the cavity 3 can largely be improved.

The supporting portions 10 made of a fluorine series resin can be constructed as follows. For example, end members 15, 16 made of steel similar to the members 7a, 7b are attached by welding or fixing-bolt respectively to the axial central portions 7c, 7d of the respective semi-circular retaining ring members 7a, 7b for preventing detachment of the ring 12 from the members 7a, 7b. Meanwhile, fluorine series resins 12 are engagingly inserted in respective dovetail grooves 7g, 7h which were preliminarily formed on the respective central portions 7c, 7d. Another end members 17, 18 made of steel similar to the members 7a, 7b are fixed respectively on the central portions 7c, 7d by means of e.g.

bolts 13 for preventing detachment of the ring 12 from the members 7a, 7b. As a result, the fluorine series resins 12 are embedded respectively in the semi-circular retaining ring members 7a, 7b but protrude in a desired amount to radially inward direction from the inner surface of the central portions 7c, 7d thereby to form the supporting portions 10, as shown by a longitudinal cross-sectional view in FIG. 2(a) and FIG. 2(b).

The thus arranged semi-circular retaining ring members 7a, 7b and hence the retaining ring 7 has an end surface which assumes a tapered portion having a gradually decreasing width toward the radially outward direction so as to ensure a smooth and accurate insertion of the retaining ring 7 in the respective positioning recesses 1a, 1b formed in the molding die portions 1, 2.

Although the above explanations were made only with regard to one retaining ring 7, the same explanations are applied with regard to the other retaining ring 8 which is attached on the grasping metal fitting 6.

When a composite insulator is produced using such retaining rings 7, 8, at first the retaining rings 7, 8 are attached as mentioned above by means of a bolt joining of the semi-circular retaining ring members 7a, 7b on the outer circumferential surface of the respective grasping metal fittings 5, 6 which are preliminarily attached on the both end portions of the core rod 4 thereby to bring the respective supporting portions 10 into contact with the grasping metal fittings 5, 6, and then the respective retaining rings 7, 8 are engagingly inserted in the positioning recesses 1a, 2a, 1b, 2b of the upper and lower molding die portions 1, 2 thereby to position and retain the core rod 4 at a desired position in the cavity 3.

The filling of the insulative high molecular material in the cavity 3 can be performed by providing a layer of the high molecular material of a desired thickness around the core rod 4 prior to the insertion of the core rod 4 in the molding die or the closure of the molding die if the molding method is a press molding, or by pressurized introduction of the high molecular material in the cavity 3 if the molding method is an injection molding, etc.

Thereafter, the insulative high molecular material in the cavity 3 is vulcanized and formed under heating of the respective molding die portions 1, 2.

At the time of vulcanization and forming, the core rod 4 is also heated. Therefore, an increase of the diameter of the core rod 4 due to its thermal expansion is unavoidable. Nevertheless, the increase of the inner pressure in the high molecular material resulting from the increase of the diameter of the core rod 4 can effectively be dealt with by allowing the high molecular material to flow out to the exterior of the cavity 3 through the gaps between the outlet portion 11 and the grasping metal fittings 5, 6 under the function of the outlet portion 11, and the flow-out of the high molecular material can extremely effectively prevent the increase of the inner pressure in the high molecular material caused by the thermal expansion of the core rod 4.

FIG. 3 is a partial cross-sectional view illustrating the flowing-out state of the high molecular material, wherein a portion of the high molecular material which became excess due to the thermal expansion of the core rod 4 is flowed out linearly outwardly in the axial direction on the surface of the grasping metal fitting 5 through the gaps between the outlet portion 11 and the surface of the grasping metal fitting 5. If the grasping metal fittings 5, 6 and the retaining rings 7, 8 are respectively made of a metallic material of a relatively large specific heat and thermal conductivity, they can be maintained at a low temperature for a relatively long time, so that even though the respective cross-sectional area of the gaps is small the hardening of the high molecular material flowed in the gaps due to vulcanization during the flowing-out from the cavity 3 can sufficiently be prevented to always ensure the abovedescribed smooth flowing-out of the high molecular material.

Thus, the increase of the inner pressure in the high molecular material in the cavity 3 resulting from the thermal expansion of the core rod 4 can effectively be prevented by allowing a portion of the high molecular material to flow out to the exterior of the cavity 3 through the gaps formed by the outlet portions 11 of the respective retaining rings 7, 8, and as a result occurrence of the cracks on the parting line which is formed on the shed portions 22 protruding radially outwardly from the sheath 21 at plural positions spaced in the length direction of the core rod 4 and the sheath 21 which is formed with a uniform thickness around the whole circumference of the core rod 4 and on the neighborhood of the parting line, can be prevented.

In this circumstance, the amount of the flowed-out high molecular material is far smaller as compared with that of the conventional technique of using a loose fastening force, so that utilizing percentage of the raw material can sufficiently be enhanced. In addition, the above-described arrangement of the retaining rings 7, 8 can be realized by providing the supporting portions 10 and the outlet portions 11 respectively on the heretofore necessary retaining rings 7, 8 for positioning and retaining the core rod 4, so that the number of working processes can largely be reduced as compared with the conventional technique of providing a large number of outlet grooves on the contacting surfaces of the upper and lower molding die portions. Moreover, the above-described forming by vulcanization can be effected at a high vulcanization temperature, so that the production efficiency can effectively be improved under a decreased vulcanization time.

The composite insulator produced by the above-described forming method by vulcanization is taken out together with the retaining rings 7, 8 from the upper and lower molding die portions after the opening thereof, and the retaining rings 7, 8 are released from the grasping metal fittings 5, 6 by decomposing the retaining rings 7, 8 into respective semi-circular members, and, if desired, the flowed-out high molecular material adhered on the surface of the grasping metal fittings 5, 6 is removed to give a finished product, so that the processes required for cleaning the molding die after completion of each molding portion can also be largely decreased.

The abovementioned circumstance of producing a composite insulator using the retaining rings according to the present invention, and the circumstance of producing a composite insulator using conventional retaining rings which tightly seal between the retaining rings, and the grasping metal fittings by means of a sealing member, are respectively inspected on the occurrence of the cracks at the parting line of the sheath and the shed portions and the neighboring portions of the parting line, using the vulcanization time as a parameter. The results are as shown in the following Table 1.

In the inspection experiments, molding die temperature was 170° C., fastening force for the molding die portions was 230 ton (830 kg/cm$^2$), and the molding method was press molding.

TABLE 1

| Retaining ring | Vulcanization time (min.) | Cracks | Maximum inner pressure (kg/cm$^2$) |
|---|---|---|---|
| Conventional | 15 | ⊚ | 235 |
|  | 20 | ○ | 258 |
|  | 25 | Δ | 266 |
|  | 30 | x | 277 |
|  | 40 | x | 285 |
| Invention | 15 | ⊚ | 212 |
|  | 20 | ⊚ | 232 |
|  | 25 | ⊚ | 242 |
|  | 30 | ⊚ | 249 |
|  | 40 | Δ | 265 |

In the above Table 1, ⊚ represents non-occurence of cracks (generation percentage 0%), ○ represents occurence of cracks of generation percentage of less than 30%, Δ represents occurence of cracks of generation percentage of not less than 30%, and X represents occurrence of cracks of generation percentage of 100%.

As seen from the above Table 1, the maximum inner pressure in the high molecular material can be suppressed low to sufficiently prevent the generation of the cracks on the parting line an its neighboring portions, regardless of the vulcanization time, if the retaining ring according to the present invention is used and the vulcanization time is within 30 min required for producing the product. In the circumstance, if the vulcanization time of 40 min was used, cracks were generated in not less than 30% of products resulting from the increase of the inner pressure in the high molecular material.

In the meantime, if conventional retaining rings are used, the generation of the cracks can be prevented merely in the case of a relatively short vulcanization time of 15 min to suppress the maximum inner pressure low. However, the cracks are generated at higher percentages with the increase of the maximum inner pressure accompanying with the increase of the vulcanization time. If the vulcanization time of 20 min is used, 30% or more of the products are obliged to generate cracks.

As clearly seen from the above embodiments, according to the present invention, the generation of cracks on the parting line of the sheath and the shed portion and the neighboring portions of the parting line caused by the increase of the inner pressure in the insulative high molecular material at the time of vulcanization can effectively be prevented by allowing an excess portion of the high molecular material to flow out to the exterior of the cavity through the gaps between the grasping metal fittings and the retaining rings to prevent the increase of the inner pressure in the high molecular material.

The simple structure of providing supporting portions and the outlet portions respectively on the retaining rings which are used for positioning and arranging the core rod in the cavity can allow smooth flowing-out of the high molecular material from the cavity, so that the working processes for providing many grooves on the contacting surfaces of the molding die portions become unnecessary and can be dispensed with, the cleaning processes of the grooves after completion of each vulcanization forming become also unnecessary and can be dispensed with, and the vulcanization can be completed within a short period of time at higher vulcanization temperatures.

Although the present invention has been explained with specific examples and numeral values, it is of course apparent to those skilled in the art that various changes and modifications are possible without departing from the broad spirit and aspect of the present invention as defined in the appended claims.

What is claimed is:

1. A retaining ring for positioning and retaining a core rod in molding die portions at a desired position in the cavity of the molding die portions, while circumscribing the grasping metal fittings engagingly fitted and fixed on the both end portions of the core rod, comprising supporting portions on the inner circumferential surface of the retaining ring, which supporting portions contacting with the outer circumferential surfaces of the grasping metal fittings, and gaps defined along the length of the axial direction of the retaining rings between the inner circumferential surfaces of the retaining rings and the outer circumferential surfaces of the grasping metal fittings.

2. The retaining ring of claim 1, comprising supporting portions and outlet portions respectively provided at plural portions on the circumference of the retaining ring.

3. The retaining of claim 1, comprising the supporting portions comprised of a fluorine series resin.

* * * * *